US012657280B2

(12) United States Patent
Wu et al.

(10) Patent No.: US 12,657,280 B2
(45) Date of Patent: Jun. 16, 2026

(54) COMPONENT AUTHENTICATION METHOD AND APPARATUS

(71) Applicant: Huawei Technologies Co., Ltd., Shenzhen (CN)

(72) Inventors: Lingling Wu, Shenzhen (CN); Xiaochuan Li, Chengdu (CN); Chao Zhang, Hangzhou (CN); Hong Li, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 9 days.

(21) Appl. No.: 18/817,556

(22) Filed: Aug. 28, 2024

(65) Prior Publication Data

US 2024/0419776 A1    Dec. 19, 2024

Related U.S. Application Data

(63) Continuation of application No. PCT/CN2023/078458, filed on Feb. 27, 2023.

(30) Foreign Application Priority Data

Feb. 28, 2022    (CN) ........................ 202210188449.X

(51) Int. Cl.
G06F 21/00        (2013.01)
G06F 9/445        (2018.01)
G06F 21/44        (2013.01)

(52) U.S. Cl.
CPC .......... G06F 21/44 (2013.01); G06F 9/44526 (2013.01)

(58) Field of Classification Search
None
See application file for complete search history.

(56) References Cited

U.S. PATENT DOCUMENTS

2015/0339152 A1* 11/2015 Lo ............................. G06F 8/71
                                                                              718/1
2022/0043914 A1    2/2022 Edwards et al.

FOREIGN PATENT DOCUMENTS

| CN | 110798475 A | 2/2020 | |
| CN | 111008379 A | 4/2020 | |
| CN | 112955888 A * | 6/2021 | .......... H04L 9/3226 |
| CN | 115062290 A | 9/2022 | |
| DE | 112011100514 T5 * | 11/2012 | ............. G06F 21/51 |
| WO | 2021162690 A1 | 8/2021 | |

* cited by examiner

*Primary Examiner* — Andrew J Steinle
(74) *Attorney, Agent, or Firm* — Conley Rose, P.C.

(57)        ABSTRACT

A component authentication method includes, after a computer is powered on, a baseboard management controller (BMC) in the computer sends an authentication request to one component in the computer, to initiate access authentication on the component. The component sends an access request to the BMC, where the access request carries an access authentication certificate of the component. After verification on the access authentication certificate of the component succeeds, the BMC sends an access response to the component such that, before the component is booted, the BMC verifies the access authentication certificate of the component, and the component is allowed to be booted only if the verification succeeds.

20 Claims, 6 Drawing Sheets

COMPONENT AUTHENTICATION METHOD AND APPARATUS

CROSS-REFERENCE TO RELATED APPLICATIONS

This is a continuation of International Patent Application No. PCT/CN2023/078458 filed on Feb. 27, 2023, which claims priority to Chinese Patent Application No. 202210188449.X filed on Feb. 28, 2022. The disclosures of the aforementioned applications are hereby incorporated by reference in their entireties.

TECHNICAL FIELD

This application relates to the field of computer technologies, and in particular, to a component authentication method and an apparatus.

BACKGROUND

Under the background of diversified computing power and componentization of servers, because components come from various vendors, the components face a risk of being tampered with or spoofed in a supply chain phase, for example, a transportation phase or a warehousing phase. After a component that is tampered with or spoofed is connected to a server system, risks that information is disclosed, and a component capability is hijacked and abused may exist.

SUMMARY

This application provides a component authentication method and an apparatus, to prevent a component in a computer from being spoofed or tampered with, and ensure component access security of the computer before a basic input/output system (BIOS) is booted.

According to a first aspect, an embodiment of this application provides a component authentication method. The method may be performed by a computer, where the computer includes a baseboard management controller (BMC) and a plurality of components. In the method, after the computer is powered on, the BMC sends an authentication request (which is denoted as a first authentication request) to one component, where the first authentication request is used for initiating access authentication on the component. The component receives the first authentication request sent by the BMC and sends an access request (which may be denoted as a first access request) to the BMC, where the first access request includes an access authentication certificate of the component. After verification on the access authentication certificate of the component succeeds, the BMC sends an access response (which may be denoted as a first access response) to the component, where the first access response is used for triggering the component to be booted, or if verification on the access authentication certificate fails, the BMC rejects access to the component.

Based on the foregoing design, after the computer is powered on, the BMC in the computer sends the authentication request to one component in the computer, to initiate the access authentication on the component. The component sends the access request to the BMC, where the access request carries the access authentication certificate of the component. After verification on the access authentication certificate of the component, the BMC sends the access response to the component. In this application, before the component is booted, the BMC verifies the access authentication certificate of the component, and the component is allowed to be booted, only if the verification succeeds. This manner effectively reduces a security risk caused because the component is spoofed or tampered with, and effectively ensures access security of the component.

In a possible implementation, before the BMC sends the first access request to the component, the method further includes the following. The BMC sends an access request (which is denoted as a second access request) and an access authentication certificate of the BMC to a management module. After verification on the access authentication certificate of the BMC succeeds, the management module sends an access response (which may be denoted as a second access response) to the BMC, where the second access response is used for triggering the BMC to perform access authentication on the component.

Based on the foregoing design, the management module verifies the access authentication certificate of the BMC, to effectively reduce a security risk caused because the BMC is spoofed or tampered with, ensure access security of the BMC, and further improve reliability of the computer component.

In a possible implementation, that the BMC rejects access to the component includes one or more of the following. The BMC alarms the component, the BMC forbids the component to be booted, and the BMC powers off the component.

Based on the foregoing design, after identifying a component whose identity is suspicious (for example, the access authentication certificate fails), the BMC may perform further processing on the component, for example, generating an alarm, forbidding the component to be booted, or powering off the component, to prevent the suspicious component from performing an invalid operation, reduce a data leakage risk, and improve reliability of the computer. Operation and maintenance personnel may also check, based on the alarm, and the like, whether the invalid component is connected to the computer, to reduce a work burden of operation and maintenance personnel.

In a possible implementation, the component includes a computing unit, a storage unit, an I/O unit, an acceleration unit, and a memory expansion unit.

In a possible implementation, after the BMC sends the first access response to the component, the method further includes the following. The component is the computing unit, and the component loads and runs a BIOS file (for example, BIOS code), or the component is one of the storage unit, the I/O unit, the acceleration unit, and the memory expansion unit, and the component loads and runs a firmware file.

Based on the foregoing design, after the verification on the access authentication certificate of the component succeeds, the BMC triggers the component to be booted. This can ensure the access security of the component before the computer boots the BIOS.

In a possible implementation, the first authentication request includes a random number (which may be denoted as a first random number) generated by the BMC. The first access request further includes signature data, and the signature data is obtained by signing the first random number by using a private key of the component. After the BMC receives the first access request sent by the first component, the method further includes the following. The BMC obtains a public key of the component and a random number (which may be denoted as a second random number) based on the first access request, where the public key of the component is obtained by the BMC decrypting the access authentication certificate of the component by using a public key of a certification authority (CA). The second random number is obtained by the BMC decrypting the signature data by using the public key of the component. Then, the BMC compares the first random number with the second random number. If the second random number is consistent with the first random number, it is determined that verification on the access authentication certificate succeeds, or if the second random number is inconsistent with the first random number, it is determined that verification on the access authentication certificate fails.

Based on the foregoing design, because the access authentication certificate is generated by the certification authority and is difficult to be forged, the BMC verifies the access authentication certificate of the component, so that the component that is spoofed or forged can be accurately identified, thereby improving accuracy of the access authentication.

In a possible implementation, the access authentication certificate of the component is preset in the component before delivery. The access authentication certificate of the component is obtained by signing information about the component by using a private key of the CA. The information about the component includes the public key of the component and a component identifier of the component. The access authentication certificate of the BMC and the public key of the CA are preset in the BMC before delivery.

Based on the foregoing design, the private key, the access authentication certificate, and the like of the component may be preset in the component in a production phase of the component, thereby reducing the security risk caused because the component is spoofed or tampered with in a supply chain phase, and ensuring the access security of the component when a computing device is booted.

In a possible implementation, the public key of the component, the private key of the component, and the component identifier of the component are preset in the component before delivery. The component identifier is obtained by the component from the CA. Both the public key of the component and the private key of the component are derived from the component identifier.

According to a second aspect, an embodiment of this application provides a component authentication method. The method may be applied to a computer, and may be performed by a BMC in the computer. In the method, after a computer is powered on, a BMC sends a first authentication request to one component included in the computer. The first authentication request is used for initiating access authentication on the component. The BMC receives a first access request sent by the component. The first access request includes an access authentication certificate of the component. After verification on the access authentication certificate of the component succeeds, the BMC sends a first access response to the component, where the first access response is used for triggering the component to be booted, or if verification on the access authentication certificate fails, the BMC rejects access to the component.

In a possible implementation, before the BMC sends the first access request to the component, the method further includes the following. The BMC sends a second access request and an access authentication certificate of the BMC to a management module. The BMC receives a second access response sent by the management module. The second access response is used for triggering the BMC to perform access authentication on the component. The second access response is sent by the management module to the BMC after verification on the access authentication certificate of the BMC succeeds.

In a possible implementation, that the BMC rejects access to the component includes one or more of the following. The BMC alarms the component, the BMC forbids the component to be booted, and the BMC powers off the component.

In a possible implementation, the first authentication request includes a random number (which may be denoted as a first random number) generated by the BMC. The first access request further includes signature data. The signature data is obtained by signing the first random number by using a private key of the component.

After the BMC receives the first access request sent by the first component, the method further includes the following. The BMC obtains a public key of the component and a random number (which is denoted as a second random number) based on the first access request. The public key of the component is obtained by the BMC decrypting the access authentication certificate of the component by using a public key of a certification authority (CA). The second random number is obtained by the BMC decrypting the signature data by using the public key of the component. Then, the BMC compares the first random number with the second random number. If the second random number is consistent with the first random number, it is determined that verification on the access authentication certificate succeeds, or if the second random number is inconsistent with the first random number, it is determined that verification on the access authentication certificate fails.

In a possible implementation, the access authentication certificate of the component is preset in the component before delivery. The access authentication certificate of the component is obtained by signing information about the component by using a private key of the CA. The information about the component includes the public key of the component and a component identifier of the component. The access authentication certificate of the BMC and the public key of the CA are preset in the BMC before delivery.

According to a third aspect, an embodiment of this application provides a component authentication method. The method may be applied to a computer, and may be performed by a component in the computer. In the method, after a computer is powered on, one component in the computer receives a first authentication request sent by a BMC in the computer. The first authentication request is used for initiating access authentication on the component. The component sends a first access request to the BMC. The first access request includes an access authentication certificate of the component. The component receives a first access response sent by the BMC. The first access response is used for triggering the component to be booted. After verification on the access authentication certificate of the component succeeds, the first access response is sent by the BMC to the component, or when verification on the access authentication certificate of the component fails, the BMC rejects access to the component.

In a possible implementation, the access authentication certificate of the component is preset in the component before delivery. The access authentication certificate of the component is obtained by signing information about the component by using a private key of a certification authority (CA). The information about the component includes a public key of the component and a component identifier of the component. The access authentication certificate of the BMC and the public key of the CA are preset in the BMC before delivery.

In a possible implementation, the public key of the component, the private key of the component, and the component identifier are preset in the component before delivery. The component identifier is obtained by the component from the CA. Both the public key of the component and the private key of the component are derived from the component identifier.

In a possible implementation, the component includes a computing unit, a storage unit, an input/output (I/O) unit, an acceleration unit, and a memory expansion unit.

According to a fourth aspect, an embodiment of this application further provides a component authentication apparatus. The apparatus has a function of implementing the BMC in the method instance in the second aspect, or a function of implementing the component in the method instance in the second aspect. The function may be implemented by hardware, or may be implemented by hardware executing corresponding software. The hardware or the software includes one or more modules corresponding to the foregoing function. In a possible design, a structure of the apparatus includes an obtaining module and a processing module.

According to a fifth aspect, this application further provides a computing apparatus. The computing apparatus includes a processor and a communication interface. The processor performs the method provided in any one of the first aspect or the possible implementations of the first aspect, performs the method provided in any one of the second aspect or the possible implementations of the second aspects, or performs the method provided in any one of the third aspect or the possible implementations of the third aspect. The communication interface is configured to communicate with another device.

According to a sixth aspect, this application provides a computer-readable storage medium. When the computer-readable storage medium is executed by a computing device, the computing device performs the method provided in any one of the first aspect or the possible implementations of the first aspect, performs the method provided in any one of the second aspect or the possible implementations of the second aspect, or performs the method provided in any one of the third aspect or the possible implementations of the third aspect. The storage medium stores a program. The storage medium includes but is not limited to a volatile memory, for example, a random-access memory (RAM), or a non-volatile memory, for example, a flash memory, a hard disk drive (HDD), and a solid-state drive (SSD).

According to a seventh aspect, this application provides a computer program product. The computer program product includes computer instructions. When the computer instructions are executed by a computing device, the computing device performs the method provided in any one of the first aspect or the possible implementations of the first aspect, performs the method provided in any one of the second aspect or the possible implementations of the second aspect, or performs the method provided in any one of the third aspect or the possible implementations of the third aspect. The computer program product may be a software installation package. When the method provided in any one of the first aspect or the possible implementations of the first aspect needs to be used, or when the method provided in any one of the second aspect or the possible implementations of the second aspect needs to be used, or when the method provided in any one of the third aspect or the possible implementations of the third aspect needs to be used, the computer program product may be downloaded and executed on the computing device.

According to an eighth aspect, this application further provides a chip. The chip is configured to execute a software program, to implement the method in the first aspect and the possible implementations of the first aspect, implement the method in the second aspect and the possible implementations of the second aspect, or implement the method in the third aspect and the possible implementations of the third aspect.

For beneficial effects of any one of the implementations of the second aspect to the eighth aspect, refer to the descriptions of the first aspect. Details are not described herein again.

DESCRIPTION OF EMBODIMENTS

To facilitate understanding of a component authentication method provided in embodiments of this application, the concepts and the terms in embodiments of this application are first briefly described.

1. BIOS:

The BIOS is a group of programs fixed on a read-only memory (ROM) chip on a mainboard inside a computer. The BIOS stores a most important basic input/output program of the computer, a post-power-on self-check program, a system self-booting program, and a menu program. A main function of the BIOS is to provide most underlying and most direct hardware setting, control, and access for the computer.

2. BMC:

As a platform management system, the BMC has hardware that is usually the 1st component that is powered on and booted on a mainboard of a computing device, and has a series of monitoring and control functions. Further, the BMC is connected to various sensors, and the sensors are distributed on several components of the computing device. The BMC manages each component of a computer through the sensors, for example, enables a component to be powered on or powered off.

3. Various numbers such as "first" and "second" in this application are only used for differentiation for ease of description, and are not used for limiting the scope of embodiments of this application, nor indicate a sequence. The term "and/or" describes an association relationship for describing associated objects and indicates that three relationships may exist. For example, A and/or B may indicate the following three cases: only A exists, both A and B exist, and only B exists.

The computing device in this application may be an independent physical machine, for example, a server, a desktop computer, or a notebook computer. The computing device may be deployed on a user side and serves as user equipment. The computing device may alternatively be deployed on a server side. The computing device may be an independent server, or may be a server cluster or a distributed system including a plurality of physical servers.

Figure 1:
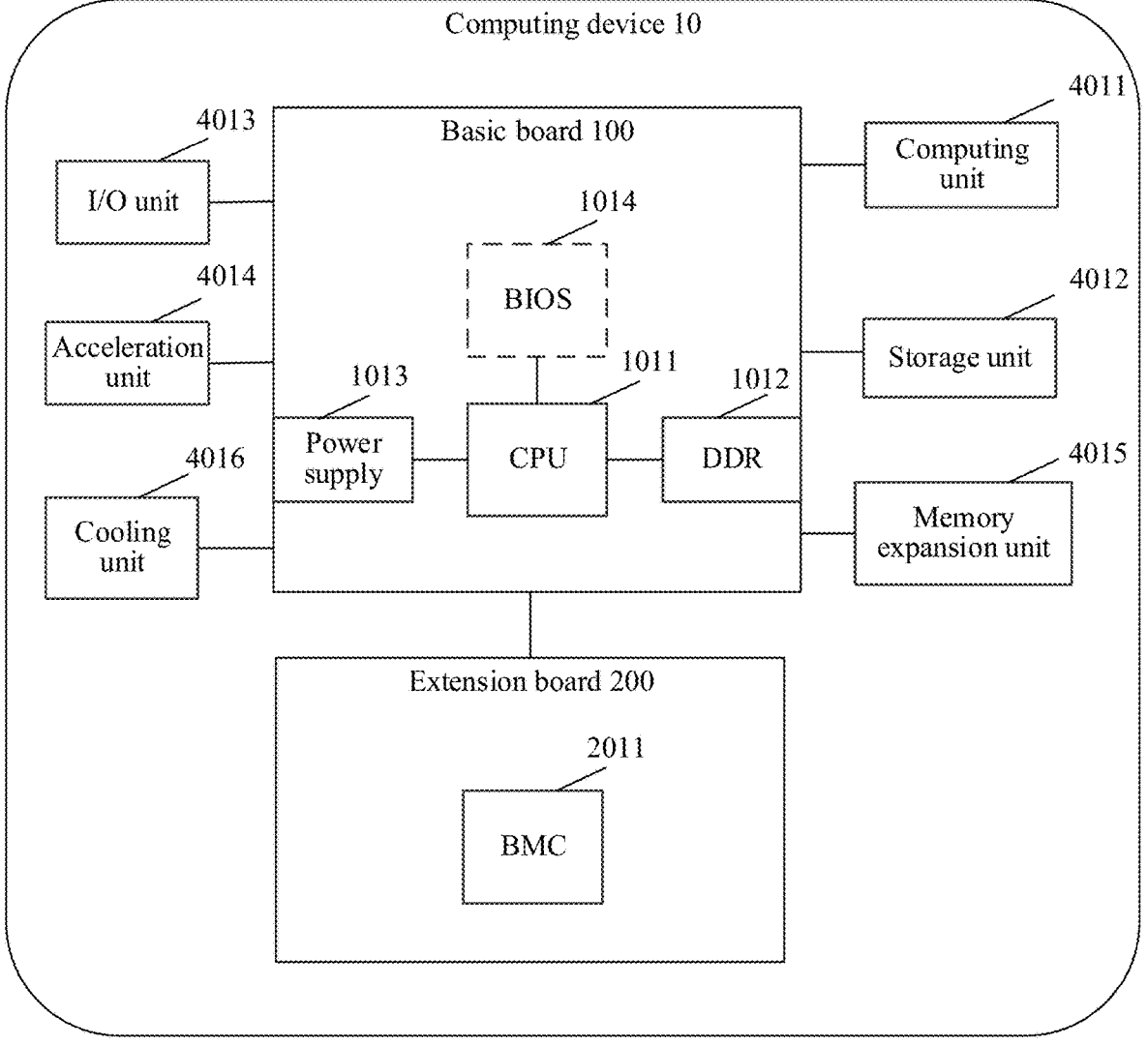
FIG. 1 is a schematic diagram of an architecture of a computing device according to an embodiment of this application.

FIG. 1 is a schematic diagram of an architecture of a computing device 10 according to an embodiment of this application. In this architecture, the computing device 10 includes a basic board (BCU) 100 and an extension board (EXU) 200. Further, in addition to the basic board 100 and the extension board 200, a same computing device may further include an expansion component. Further, the same computing device 10 may include one basic board 100 and one extension board 200, may include a plurality of basic boards 100 and one extension board 200, or may include one basic board 100 and a plurality of extension boards 200.

The basic board 100 includes a central processing unit (CPU) 1011, a double data rate (DDR) 1012, and a related power supply 1013, and provides a general-purpose computing capability and an extended interface, for example, peripheral storage, I/O, and acceleration. The basic board 100 supports CPUs of different series, for example, Kunpeng®, Intel®, and AMDR®. Optionally, the basic board 100 supports heterogeneous processors, for example, the basic board 100 may support different types of processors. For example, the basic board 100 supports one or more CPUs 1011 (where only one is shown in FIG. 1, but this is not limited in this application), and any processor, for example, an application-specific integrated circuit (ASIC), a programmable logic device (PLD), a complex programmable logic device (CPLD), a field-programmable gate array (FPGA), generic array logic (GAL), a system on chip (SoC), a software-defined infrastructure (SDI) chip, or an artificial intelligence (AI) chip or any combination thereof. Optionally, the basic board 100 may further include another component, for example, a BIOS chip 1014.

Further, based on a service requirement and a hardware attribute, embodiments of this application provide at least six basic boards 100 in different forms, separately for different computing performance and memory configurations. For ease of description, the six basic boards 100 are respectively referred to as A1, A2, B1, B2, C1, and C2. In addition, in embodiments, "P" indicates a quantity of processors, where P is an integer greater than 0. "DPC" indicates a dual in-line memory module (DIMM) per channel. For example, the basic board 100 in the A1 form supports one processor, where one DIMM is inserted into each channel (1P1DPC). The basic board 100 in the A2 form supports one processor, where one or two DIMMs are inserted into each channel (1P2DPC or 1P1DPC). The basic board 100 in the B1 form supports two processors, where one DIMM is inserted into each channel (2P1DPC), or one processor, where one or two DIMMs are inserted into each channel (1P2DPC or 1P1DPC). The basic board 100 in the B2 form supports two processors, where one or two DIMMs are inserted into each channel (2P2DPC or 2P1DPC), or one processor, where one or two DIMMs are inserted into each channel (1P2DPC or 1P1DPC). The basic board 100 in the C1 form supports four processors, where one DIMM is inserted into each channel (4P1DPC), or two processors, where one or two DIMMs are inserted into each channel (2P2DPC or 2P1DPC). The basic board 100 in the C2 form supports four processors, where one or two DIMMs are inserted into one channel (4P2DPC or 4P1DPC), or two processors, where one or two DIMMs are inserted into each channel (2P2DPC or 2P1DPC). With technology development, CPU package dimensions, a memory channel, and a quantity of DIMMs may change, but standard dimensions and mounting hole positions of a mainboard remain unchanged. This can ensure that the basic board 100 implements cross-generation and cross-series compatibility and evolution when the basic board 100 is updated and upgraded. For example, currently when each CPU has eight DDR channels, the basic board 100 in the B2 form supports 2P2DPC (2P32DIMM). After a quantity of CPU memory channels is increased to 12, 2P2DPC (2P48DIMM) cannot be implemented. In this case, 2P1DPC (2P24DIMM) may be supported in the B2 form, and 2P2DPC (2P48DIMM) may be implemented in another form, for example, C1. Because mounting hole positions and dimensions of the basic board 100 are standard, the basic board 100 can be directly replaced and mounted.

The extension board 200 includes a BMC chip 2011 (or a BMC 2011), and optionally, may further include a management system and a bridge chip (for example, a platform controller hub (PCH) for an INTEL system). The extension board 200 is a management extension of the basic board 100, serves as a management center of the entire system, and provides functions of managing a device, security, energy efficiency, reliability, and the like. The BMC 2011 may also be referred to as a basic board management controller, and is configured to provide management functions and supply power for the basic board 100 and each expansion component.

In this architecture, the basic board 100 is in communication connection with a component by using a high-speed bus, for example, a Peripheral Component Interconnect Express (PCIe) bus, a compute express link (CXL) bus, or a unified bus (UB or Ubus), and is connected to the extension board 200 by using a management interface. In specific implementation, a specific connection manner between the basic board 100 and the component and between the basic board 100 and the extension board 200 includes a soft connection manner in which the foregoing connection is implemented through a cable, or a hard connection manner in which the foregoing connection is implemented by using a connector.

The component is a general name for a type of electronic component or electronic device. Components may be divided into a computing unit 4011, a storage unit (STU) 4012, and an I/O unit (IOU) 4013, an acceleration unit (ACU) 4014, a memory expansion unit (MEU) 4015, and a cooling unit 4016. The computing unit, for example, a CPU and a memory may be located on a basic board, and a BMC may be located on an extension board. The following separately describes the components.

The storage unit 4012 includes a hard disk backplane, an expander, a PCIe switch, and the like. The storage unit 4012 is used for system storage expansion and supports a plurality of media and forms, for example, an HDD, an SSD, a NVM Express (NVMe), and storage class memory (SCM).

The I/O unit 4013 includes Riser and another component, implements system I/O expansion, and supports a standard PCIe card and an open compute project (OCP) card.

The acceleration unit 4014 includes a carrier board, an accelerator card interconnection switch, and the like, and provides system acceleration, component expansion and interconnection functions.

The memory expansion unit 4015 includes a carrier board, a memory expansion chip, a DIMM, an SCM medium, and the like, and provides a system function of expanding memory bandwidth and a memory capacity.

The cooling unit 4016 is configured to cool a computing device or hardware in the computing device, including a combination of several cooling manners, for example, air cooling, liquid cooling, or a combination thereof. It should be understood that a structure of a cooling unit, a type of cooling unit, and a quantity of cooling units do not constitute a limitation on the technical solutions that need to be protected in this application.

It should be noted that details are as follows: (1) The components listed above are only examples of some components. For example, the components may further include a power supplying component. A component in this application is a general name of electronic components or electronic devices included in a server architecture. Some components may be located on a basic board, and some components may be located on an extension board. A component that belongs to neither the basic board nor the extension board is referred to as an expansion component in embodiments. In conclusion, an electronic component or an electronic device in any computing device falls within the protection scope of this application. (2) Locations of the components shown in FIG. 1 are only examples, and a deployment form and a connection manner in an actual product in this application are not limited. (3) The architecture of the computing device 10 shown in FIG. 1 is only an example. In actual application, the computing device 10 may include more or fewer components than the components in FIG. 1. For example, the computing device 10 may further include a cooling unit and a peripheral (a mouse or a keyboard). For another example, the computing device 10 may not include the storage unit 4012. This is not limited in this application, and a quantity of various components is not limited in this application.

In addition, in a server architecture, due to evolution of power supplying, a quantity of memory channels, an I/O quantity, a rate, and the like, usually, for a socket of a processor (for example, a CPU), only compatibility of each generation (Tick/Tock, including two small upgrades) can be implemented, and it is difficult to implement cross-generation compatibility. For the mainboard provided in this application, an external interface may be disposed in a standardized manner, and various external expansions may be performed in a soft connection manner, for example, a cable. This can shield differences caused by related power supplying of a processor, interconnection between different processors and different components, and interconnection between components. In this way, a change of a component, for example, a memory is included only inside the mainboard, to implement cross-generation compatibility of the mainboard. In this way, for vendors, when the processor is updated and upgraded, matching integrated equipment and matching components may not be replaced. Therefore, the matching component has a longer life cycle. Without replacing a chassis or increasing a workload of hardware development, a customer can use a latest component as a replacement at any time and use a latest computing power in the industry as quickly as possible. For a vendor of the integrated equipment, after cross-generation upgrade and cross-series evolution of a new server architecture are implemented, for processor upgrade or a change to a different processor vendor, only a basic board needs to be replaced simply. This subverts an original development mode and derives a new industry mode.

In the foregoing design, functions on a mainboard are discretized into independent components, so that the mainboard is divided into a basic board, an extension board, and a component. In this way, the component may be independently produced, sold, installed, and the like. For the vendor of the integrated equipment, this design provides flexibility and convenience for computing device expansion, component maintenance, and the like. However, these components are more easily spoofed or tampered with, especially in a transportation phase and a warehousing phase of a computing device, the components in the computing device are more easily replaced. Once a component spoofed or tampered with accesses the computing device, problems that a component capability is hijacked and abused, information is disclosed, and the like may be caused. Numerous security risks exist.

Therefore, embodiments of this application provide a component authentication method. According to the method, after a computer is powered on, a BMC performs access authentication on a component in a computing device. The component is allowed to be accessed and triggers the component to be booted, only after the authentication succeeds. If the authentication fails, access to the component is rejected. This reduces a security risk caused because the component is spoofed or tampered with in processes such as transportation and warehousing in a supply chain phase, and ensures access security of the component when the computing device is booted.

Figure 2:
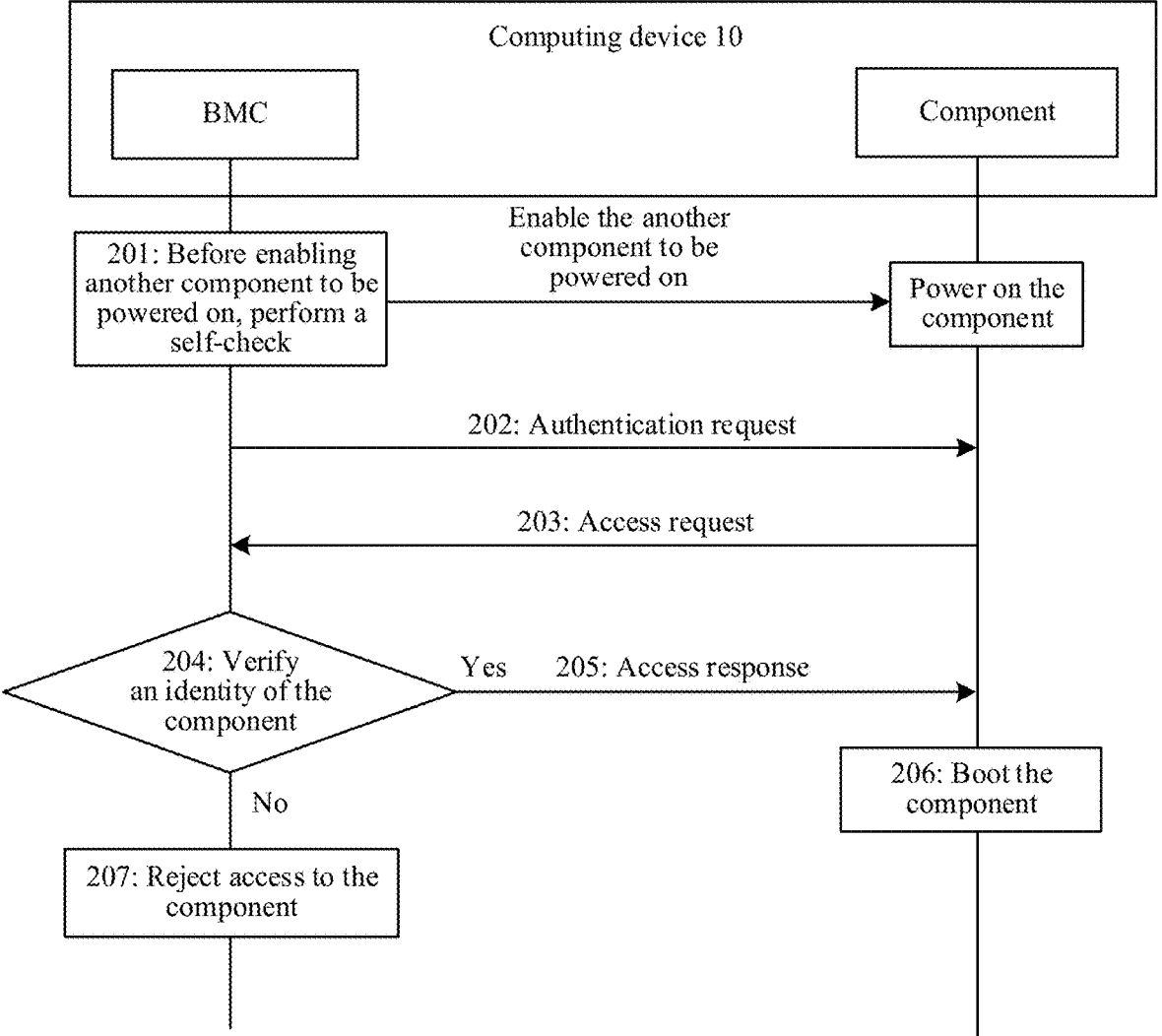
FIG. 2 is a schematic flowchart of a component access authentication method according to an embodiment of this application.

With reference to FIG. 2, the following describes in detail the component authentication method provided in embodiments of this application by using an example in which an embodiment of this application is applied to the architecture of the computing device 10 shown in FIG. 1. The method may be performed by the computing device 10 in FIG. 1.

FIG. 2 is a schematic flowchart corresponding to an access authentication method according to an embodiment of this application. As shown in FIG. 2, the method includes the following steps.

Step 201: After a BMC of the computing device 10 is powered on, enable another component to be powered on.

Optionally, before enabling the other component to be powered on, the BMC may further perform a self-check. The self-check includes secure booting, for example, checking a root of trust of the BMC, to reduce a risk that the BMC is spoofed or tampered with. The self-check may further include checking integrity of firmware information of the computing device 10. After completing the self-check, the BMC enables the other component to be powered on. For this step, refer to content set forth in the related technology. This is not particularly described herein.

Then, the BMC performs access authentication on another component in the computing device 10. The following describes this process by using one component as an example.

Step 202: The BMC sends an authentication request to the component. Correspondingly, the component receives the authentication request sent by the BMC.

The component herein may be one component in the computing device 10, for example, one computing unit (for example, the CPU in the basic board), one I/O unit, one storage unit, or one acceleration unit. The authentication request is used for requesting to perform access authentication on the component, for example, perform verification on an access authentication certificate of the component.

Step 203: The component sends an access request to the BMC, where the access request includes the access authentication certificate of the component. Correspondingly, the BMC receives a first access request sent by the component.

Step 204: The BMC verifies the access authentication certificate of the component, and if the verification succeeds, step 205 is performed, or if the verification fails, step 207 is performed.

Step 205: The BMC sends an access response to the component, where the access response is used for triggering the BMC to be booted.

Step 206: The component is booted.

For example, if the component is a CPU of a basic board, the CPU loads and runs BIOS code, and loads and runs a firmware loading program to load and boot firmware. For a subsequent booting procedure, refer to content set forth in the related technology. For example, a BIOS and firmware load a bootloader of an operating system (OS), the bootloader loads a kernel of the OS, and the kernel of the OS boots system software. This is not particularly described herein. This is not limited in this application.

Step 207: The BMC rejects access to the component.

A manner in which the BMC rejects the access to the component includes but is not limited to one or more of the following.

1. The BMC alarms the component.

2. The BMC forbids the component to be booted.

3. The BMC powers off the component.

When alarming the component, the BMC may generate the alarm in one or more manners, for example, a text, a picture, an audio, or a video, to indicate that an identity of the component is abnormal. The BMC may generate the alarm locally on the computing device 10, or may send the alarm to a remote device. This is not further limited.

A manner in which the BMC performs access authentication on the component is described in detail in the following two aspects. A first aspect is a production procedure of the access authentication certificate of the component (refer to a procedure shown in FIG. 3). A second aspect is a procedure in which the BMC verifies the access authentication certificate of the component (refer to a procedure shown in FIG. 4). The following describes the foregoing two procedures still by using one component as an example.

Figure 3:
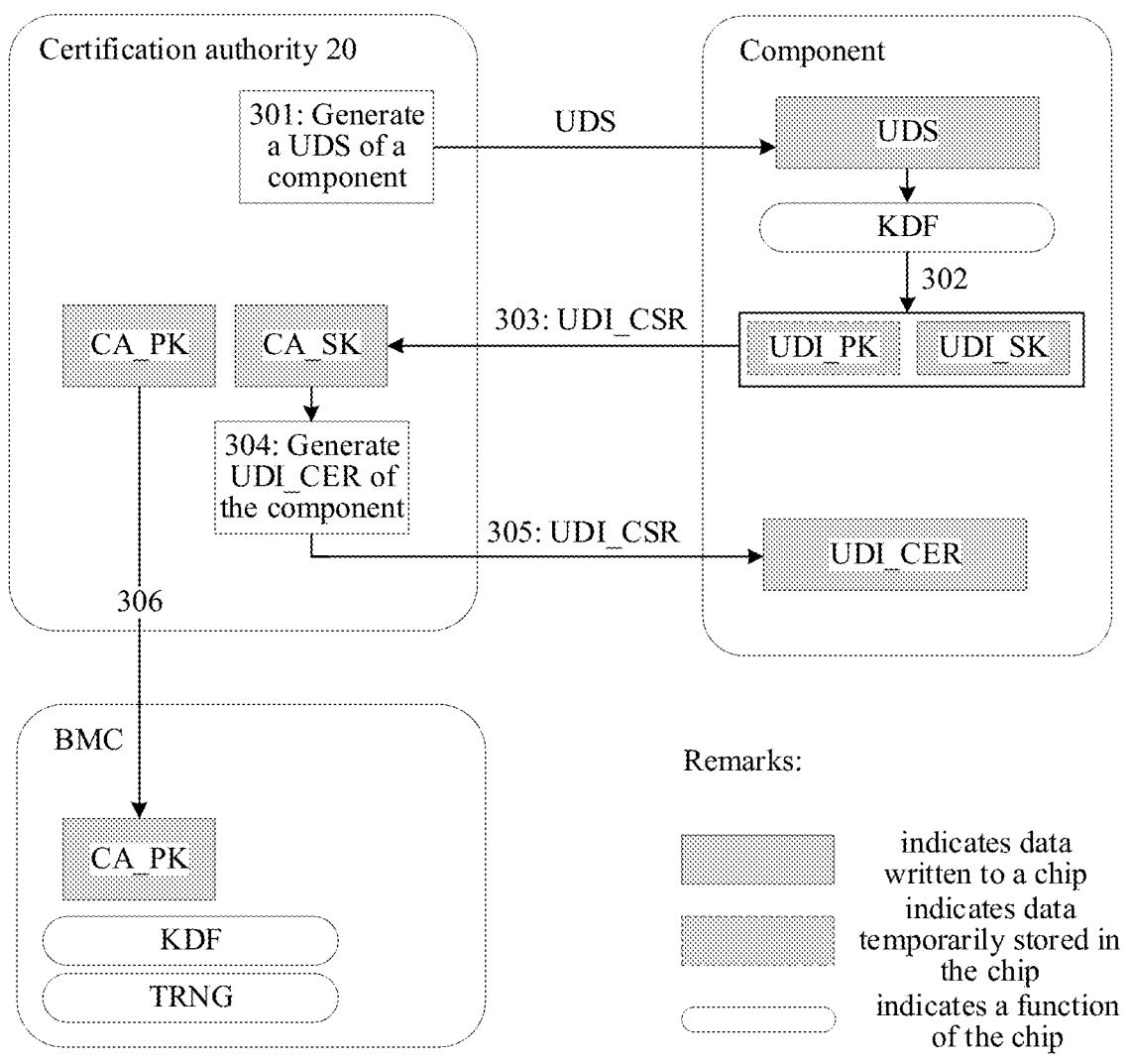
FIG. 3 is a schematic flowchart corresponding to a generation manner of an access authentication certificate according to an embodiment of this application.

FIG. 3 is a schematic flowchart of production of an access authentication certificate according to an embodiment of this application. A system to which the manner is applied includes the computing device 10 and a certification authority (CA) 20. The certification authority 20 may be an organization shared by a plurality of cooperation vendors (or trust alliances), and is configured to issue an access authentication certificate to a component of each cooperation vendor. In this way, the components of the cooperation vendors can be compatible with each other. As shown in FIG. 3, the procedure includes the following steps.

Step 301: A component in the computing device 10 applies to the certification authority 20 for a unique component identifier (UDS), and writes the UDS into a chip of the component.

Step 302: The component derives a public-private key pair based on the UDS, and writes the public-private key pair into the chip.

For example, the component generates a public-private key pair of the component based on the UDS of the component by using a key derivation function (KDF), where the public-private key pair includes a public key (UDI_SK) and a private key (UDI_PK). A person skilled in the art may know that the component signs (or encrypts) data by using the private key, and the public key can decrypt the data signed by the private key.

In this application, the public key of the component may not be written into the chip. After the access authentication certificate of the component is obtained based on the public key (refer to step 305), the public key is deleted. In an example, the component temporarily stores the public key, and deletes the public key after the public key is used, to save a storage resource of the chip.

Step 303: The component sends a certificate signing request (UDI_CSR) to the certification authority 20, where UDI_CSR includes the public key of the component and a component identifier of the component (that is, the UDS of the component). Correspondingly, the certification authority 20 receives the certificate signing request sent by the component.

Step 304: The certification authority 20 signs UDI_CSR by using a private key of the certification authority 20 (that is, a private key CA_SK of the certification authority 20) and generates the access authentication certificate (UDI_CER) of the component.

For example, an example in which UDI_CSR includes the UDS of the component and the public key of the component is used. UDI_CSR generated by the component and the access authentication certificate of the component generated by the certification authority 20 are shown in Table 1.

TABLE 1

| Access request (UDI_CSR) | | Access authentication certificate (UDI_CER) |
|---|---|---|
| Component identifier (UDS) | Public key of the component (UDI_PK) | Sign (UDS ‖ UDI_PK) |

Sign indicates a signature, and UDS‖ UDI_PK indicates that data includes two parts: the UDS and UDI_PK.

It should be noted that the access authentication certificate shown in Table 1 is only an example. The access authentication certificate applicable to this application may alternatively have another structure. This is not limited. In addition, a signature manner is also an example, and another manner may alternatively be included. For example, before signing UDI_CSR, the certification authority 20 may further encrypt UDI_CSR (or which is referred to as a digest operation), and then sign an obtained digest by using CA_SK. This is not still limited in this application.

Step 305: The certification authority 20 sends the access authentication certificate (that is, UDI_CER) of the component to the component. Correspondingly, the component receives the access authentication certificate sent by the certification authority 20, and writes the access authentication certificate into the chip of the component.

Figures 4, 5:
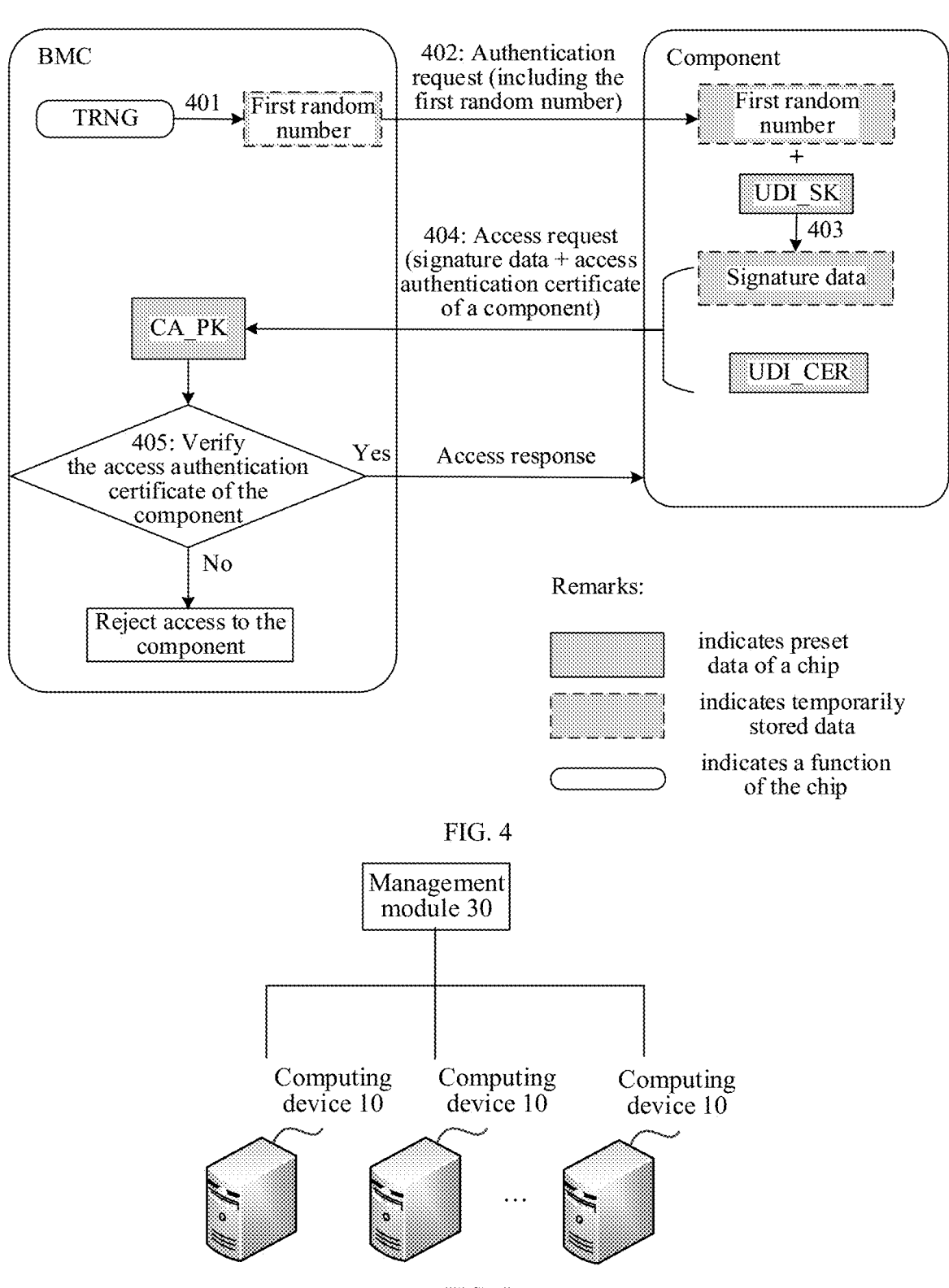
FIG. 4 is a schematic flowchart corresponding to an authentication manner of an access authentication certificate according to an embodiment of this application.
FIG. 5 is a schematic diagram of a possible applicable system architecture according to an embodiment of this application.

Step 306: The certification authority 20 sends a public key of the certification authority 20 (that is, a public key CA_PK of the certification authority 20) to a BMC, and the BMC writes the public key of the certification authority 20 into a chip of the BMC. When performing access authentication on the component, the BMC stores the public key of the certification authority 20, to verify the access authentication certificate of the component by using the public key of the certification authority 20. FIG. 4 is used below for description.

It should be noted that details are as follows: (1) The foregoing operation in which the data (for example, the access authentication certificate and the public-private key pair) is written into the chip may be alternatively replaced by encrypting the data and then storing the encrypted data into a non-volatile storage (for example, flash memory) of the component. This is not limited. (2) There is no strict time sequence limitation between step 306 and other steps in FIG. 3. For example, step 306 may be performed before 301, or may be performed in any step after step 301. This is not limited.

FIG. 4 is a schematic flowchart of verifying an access authentication certificate of a component according to an embodiment of this application. The manner includes the following steps.

Step 401: A BMC generates a random number (which is denoted as a first random number).

A manner in which the BMC generates the first random number is as follows. The BMC generates the first random number based on a true random number generator (TRNG), or may generate the first random number in another manner. This is not further limited.

Step 402: The BMC sends an authentication request to the component, where the authentication request includes the first random number. Correspondingly, the component receives the authentication request sent by the BMC.

Step 403: The component signs the first random number by using a private key (UDI_SK) of the component, to obtain signature data.

Step 404: The component sends an access request to the BMC, where the access request includes the signature data and the access authentication certificate of the component. Correspondingly, the BMC receives the access request sent by the component.

Step 405: The BMC verifies the access authentication certificate of the component, and if the verification succeeds, an access response is sent to the component, to indicate the component to be booted (refer to the descriptions of step 205 and step 206, and details are not described herein again). Alternatively, if the verification fails, access to the component is rejected (refer to the descriptions of step 207, and details are not described herein again).

For example, the access authentication certificate shown in Table 1 is used as an example. A procedure in which the BMC verifies the access authentication certificate of the component includes: (1) The BMC decrypts the access authentication certificate by using the public key (CA_PK) of the certification authority 20, to obtain the UDS of the component and the public key (UDI_PK) of the component. (2) The BMC decrypts the signature data carried in the access request by using the public key of the component that is obtained through decryption, to obtain a random number after decryption (which is denoted as a second random number). (3) The BMC compares the second random number with the first random number. If the second random number is consistent with the first random number, it is determined that the verification on the access authentication certificate of the component succeeds, and the verification success indicates that an identity of the component is trusted and compatible with the BMC. If the second random number is inconsistent with the first random number, it is determined that the verification on the access authentication certificate of the component fails, and an identity of the component is untrusted or incompatible with the BMC.

It should be noted that, in this phase, the BMC is further preset with an access authentication certificate of the BMC, and the like. This is not shown in FIG. 4.

Based on the foregoing design, before the component is booted, the BMC verifies the access authentication certificate of the component. If the verification succeeds, the component is allowed to be booted. If the verification fails, the access to the component is rejected. This manner reduces a security risk caused because the component is spoofed or tampered with, and effectively ensures access security of the component of the computing device 10 before the BIOS is booted.

This application further provides another trusted system. As shown in FIG. 5, the trusted system includes one or more computing devices 10 (where three computing devices 10 are shown in FIG. 5, but this is not limited in this application) and a management module 30.

The computing device 10 may be the computing device 10 in FIG. 1. Details are not described herein again. A plurality of computing devices 10 in FIG. 5 may be mutually independent devices, or may be a plurality of computing devices 10 included in a server cluster or a distributed system. This is not limited.

The management module 30 serves as an upper layer of the computing device 10, and is configured to verify an identity of a component (for example, a BMC) in one or more computing devices 10. The management module 30 may be a software module, a hardware module, or a combination of the software module and the hardware module. For example, the management module 30 may be located in any one of the computing devices 10 shown in FIG. 5, or may be located in an independent server outside the computing devices 10.

Figures 6, 7, 8:
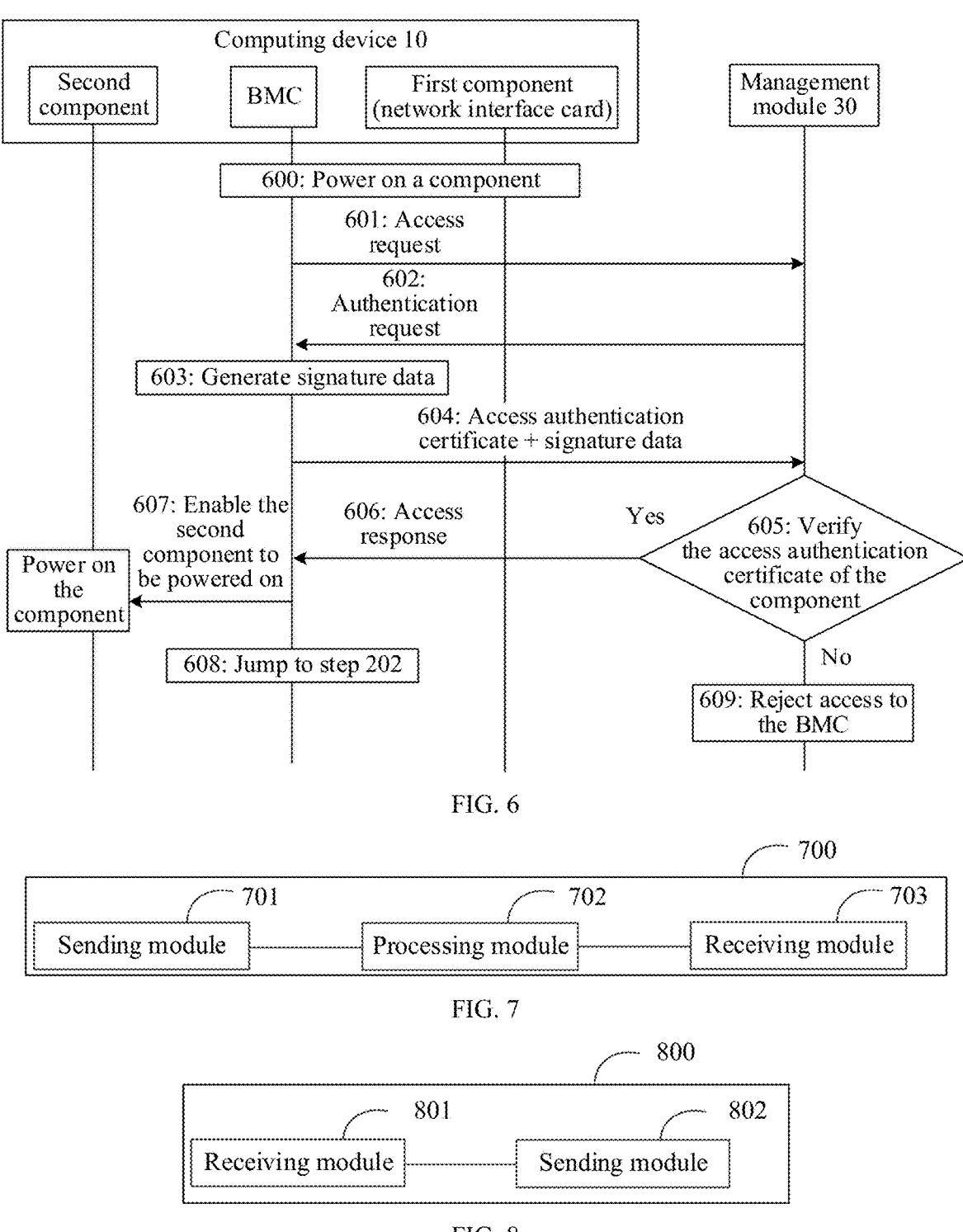
FIG. 6 is a schematic flowchart of another component access authentication method according to an embodiment of this application.
FIG. 7 is a schematic diagram of a structure of a component authentication apparatus according to an embodiment of this application.
FIG. 8 is a schematic diagram of a structure of another component authentication apparatus according to an embodiment of this application.

With reference to FIG. 6, the following describes in detail a procedure of the method by using an example in which another access authentication method provided in an embodiment of this application is applied to the system architecture shown in FIG. 5.

FIG. 6 is a schematic flowchart of another access authentication method according to an embodiment of this application. The method may be performed by the management module 30 and the computing device 10 in FIG. 5. As shown in FIG. 6, the method includes the following steps.

Step 600: A BMC and a network interface card of the computing device 10 are separately powered on.

For ease of description, the network interface card is denoted as a first component of the computing device 10, and any component other than the network interface card is denoted as a second component of the computing device 10.

After the BMC is powered on, a self-check may be further performed. Refer to the related descriptions of step 201. Details are not described herein again.

Step 601: The BMC sends an access request to the management module 30. Correspondingly, the management module 30 receives the access request from the computing device 10.

It should be noted that, if the management module 30 is located on a device other than the computing device 10, the access request is actually sent by the network interface card of the computing device 10 to the management module 30. Therefore, in the method, before access authentication is performed on the network interface card, the network interface card is first powered on. If the computing device 10 does not need to use the network interface card in this step, the network interface card may not be powered on in step 600.

Step 602: The management module 30 sends an authentication request to the BMC. Correspondingly, the BMC receives the authentication request sent by the management module. The authentication request is used for requesting to perform access verification on the BMC. The authentication request includes a random number (which is denoted as a third random number) generated by the management module 30.

Step 603: The BMC signs the third random number by using a private key of the BMC, to obtain signature data.

Step 604: The BMC sends the signature data and an access authentication certificate of the BMC to the management module 30. Correspondingly, the management module 30 receives the signature data from the BMC and the access authentication certificate of the BMC.

It should be noted that the access authentication certificate of the BMC and the private key of the BMC are also preset in a chip of the BMC. A generation manner of a public-private key pair of the BMC and a generation manner of the access authentication certificate of the BMC are the same as a generation manner of the component. For details, refer to the descriptions in FIG. 3. Details are not described herein again.

Step 605: The management module 30 verifies the access authentication certificate of the BMC, and if the verification succeeds, step 606 is performed, or if the verification fails, step 609 is performed.

Step 606: The management module 30 sends an access response to the BMC. Correspondingly, the BMC receives the access response sent by a management module. The access response is used for triggering the BMC to perform next processing (step 607).

Step 607: The BMC enables the second component to be powered on.

Step 608: Jump to perform step 202.

It should be noted that when performing access authentication on the component, the BMC performs access authentication on the first component, that is, performs access authentication on the network interface card, in addition to performing access authentication on the second component, to detect whether an identity of the network interface card is trusted, and reduce a risk that the network interface card is spoofed or tampered with. For a subsequent procedure, refer to the related descriptions in FIG. 2 or FIG. 3. Details are not described herein again.

Step 609: The management module 30 rejects access to the BMC.

For step 605, step 606, and step 609, refer to the related descriptions of step 204 (or step 405), step 205, and step 207 respectively. Details are not described herein again.

Based on the foregoing design, the management module 30 verifies the access authentication certificate of the BMC, to reduce a security risk caused because the BMC is spoofed or tampered with, ensure access security of the BMC, and further improve reliability of the computing device.

Based on a same disclosure concept as the method embodiments, an embodiment of this application further provides a component authentication apparatus. The apparatus is configured to perform the method performed by the BMC in the computing device 10 in the method embodiment in FIG. 2, FIG. 3, FIG. 4, or FIG. 6. As shown in FIG. 7, an apparatus 700 includes a sending module 701, a processing module 702, and a receiving module 703. Further, in the apparatus 700, a connection is established between modules by using a communication channel.

After the computing device 10 is powered on, the sending module 701 is configured to send a first authentication request to one component included in the computing device 10. The first authentication request is used for initiating access authentication on the component. For a specific implementation, refer to the descriptions of step 202 in FIG. 2 or the descriptions of step 402 in FIG. 4. Details are not described herein again.

The receiving module 703 is configured to receive a first access request sent by the component. The first access request includes an access authentication certificate of the component. For a specific implementation, refer to the descriptions of step 203 in FIG. 2 or the descriptions of step 404 in FIG. 4. Details are not described herein again.

After verification on the access authentication certificate of the component succeeds, the processing module 702 is configured to send a first access response to the component by using the sending module 701. The first access response is used for triggering component to be booted. Alternatively, when verification on the access authentication certificate fails, access to the component is rejected. For a specific implementation, refer to the descriptions of step 205 in FIG. 2. Details are not described herein again.

In a possible implementation, the sending module 701 is further configured to send a second access request and an access authentication certificate of the apparatus 700 to the management module. For a specific implementation, refer to the descriptions of step 601 to step 604 in FIG. 6. Details are not described herein again.

The receiving module 703 is further configured to receive the second access response sent by the management module. The second access response is used for triggering the apparatus 700 to perform access authentication on the component. The second access response is sent by the management module to the apparatus 700 after verification on the access authentication certificate of the apparatus 700 succeeds. For a specific implementation, refer to the descriptions of step 605 and step 606 in FIG. 6. Details are not described herein again.

In a possible implementation, when rejecting access to the component, the processing module 702 is further configured to perform one or more of the following: alarming the component, forbidding the component to be booted, and powering off the component. For a specific implementation, refer to the descriptions of step 207 in FIG. 2. Details are not described herein again.

In a possible implementation, the first authentication request includes a first random number generated by the processing module 702. The first access request further includes signature data, and the signature data is obtained by signing the first random number by using a private key of the component. After the receiving module 703 receives the first access request sent by the component, the processing module 702 is further configured to obtain a public key of the component and a second random number. The public key of the component is obtained by the processing module 702 decrypting the access authentication certificate of the component by using a public key of the certification authority CA. The second random number is obtained by the processing module 702 decrypting the signature data by using the public key of the component. If the second random number is consistent with the first random number, it is determined that verification on the access authentication certificate succeeds, or if the second random number is inconsistent with the first random number, it is determined that verification on access authentication certificate fails. For a specific implementation, refer to the descriptions of step 405 in FIG. 4. Details are not described herein again.

In a possible implementation, the access authentication certificate of the component is preset in the component before delivery. The access authentication certificate of the component is obtained by signing information about the component by using a private key of the CA. The information about the component includes the public key and a component identifier. The access authentication certificate of the apparatus 700 and the public key of the CA are preset in the apparatus 700 before delivery. For a specific implementation, refer to the related descriptions in FIG. 3. Details are not described herein again.

In a possible implementation, the public key of the component, the private key of the component, and the component identifier of the component are preset in the component before delivery. The component identifier is obtained by the component from the CA. Both the public key of the component and the private key of the component are derived from the component identifier. For a specific implementation, refer to the related descriptions in FIG. 3. Details are not described herein again.

Based on a same disclosure concept as the method embodiments, an embodiment of this application further provides a component authentication apparatus. The apparatus is configured to perform the method performed by the component in the computing device 10 in the method embodiment in FIG. 2, FIG. 3, FIG. 4, or FIG. 6. As shown in FIG. 8, an apparatus 800 includes a receiving module 801 and a sending module 802. Further, in the apparatus 800, a connection is established between modules by using a communication channel.

After the computing device 10 is powered on, the receiving module 801 is configured to receive a first authentication request sent by the BMC in the computing device 10. The first authentication request is used for initiating access authentication on the apparatus 800. For a specific implementation, refer to the descriptions of step 202 in FIG. 2. Details are not described herein again.

The sending module 802 is configured to send a first access request to the BMC. The first access request includes an access authentication certificate of the apparatus 800. For a specific implementation, refer to the descriptions of step 203 in FIG. 2. Details are not described herein again.

The receiving module 801 is further configured to receive a first access response sent by the BMC. The first access response is used for triggering the apparatus 800 to be booted. The first access response is sent by the BMC to the apparatus 800 after verification on the access authentication certificate of the apparatus 800 succeeds. For a specific implementation, refer to the descriptions of step 205 in FIG. 2. Details are not described herein again. Alternatively, when verification on the access authentication certificate of the apparatus 800 fails, the BMC rejects access to the apparatus 800. For a specific implementation, refer to the descriptions of step 207 in FIG. 2. Details are not described herein again.

In a possible implementation, the access authentication certificate of the apparatus 800 is preset in the apparatus 800 before delivery. The access authentication certificate of the apparatus 800 is obtained by signing information about the apparatus 800 by using a private key of a certification authority CA. The information about the apparatus 800 includes a public key of the apparatus 800 and a unique device identifier (UDS) of the apparatus 800.

In a possible implementation, the public key of the apparatus 800, a private key of the apparatus 800, and the device identifier of the apparatus 800 are preset in the apparatus 800 before delivery, and the device identifier of the apparatus 800 is obtained by the apparatus 800 from the CA. Both the public key of the apparatus 800 and the private key of the apparatus 800 are derived from the device identifier of the apparatus 800.

In a possible implementation, the apparatus 800 includes a computing unit, a storage unit, an I/O unit, an acceleration unit, and a memory expansion unit.

Figure 9:
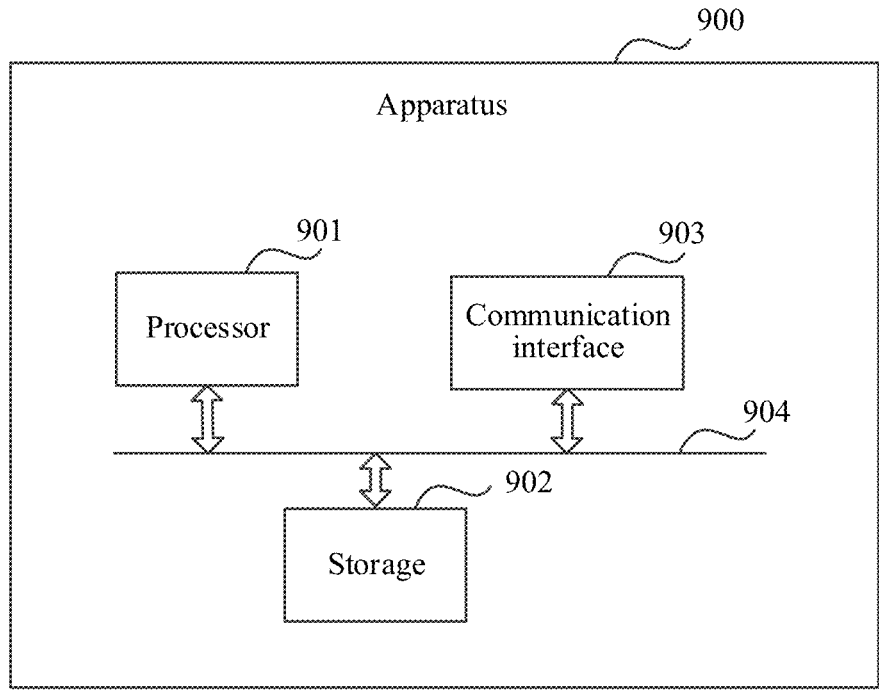
FIG. 9 is a schematic diagram of a structure of still another component authentication apparatus according to an embodiment of this application.

FIG. 9 is a schematic diagram of a component authentication apparatus according to this application. The apparatus may be the BMC (or the component authentication apparatus 700) or the component (or the component authentication apparatus 800) of the computing device 10 in the foregoing embodiments. The apparatus 900 includes a processor 901. Optionally, the apparatus 900 may further include a storage 902, a communication interface 903, and/or a communication line 904. The communication interface 903, the processor 901, and the storage 902 may be connected to each other by using the communication line 904. The communication line 904 may be a Peripheral Component Interconnect (PCI) bus, an Extended Industry Standard Architecture (EISA) bus, or the like. The communication line 904 may be classified into an address bus, a data bus, a control bus, and the like. For ease of representation, only one thick line is used for indicating the bus in FIG. 9, but this does not indicate that there is only one bus or only one type of bus.

The processor 901 may be a CPU, a microprocessor, an ASIC, or one or more integrated circuits configured to control program execution in the solutions of this application.

The communication interface 903 uses any apparatus like a transceiver, and is configured to communicate with another device or a communication network, for example, an ethernet, a radio access network (RAN), a wireless local area network (WLAN), or a wired access network.

The storage 902 may be a ROM, another type of static storage device that can store static information and instructions, a RAM, or another type of dynamic storage device that can store information and instructions, or may be an electrically erasable programmable ROM (EEPROM), a compact disc (CD) ROM (CD-ROM) or another CD storage, an optical disc storage (including a compact disc, a laser disc, an optical disc, a DIGITAL VERSATILE DISC (DVD), a BLU-RAY disc, or the like), a magnetic disk storage medium or another magnetic storage device, or any other medium that can be configured to carry or store expected program code in a form of instructions or a data structure and that can be accessed by a computer. However, this is not limited thereto. The storage may exist independently, and is connected to the processor by using the communication line 904. The storage may alternatively be integrated with the processor.

The storage 902 is configured to store computer-executable instructions for executing the solutions in this application, and the processor 901 controls the execution. The processor 901 is configured to execute the computer-executable instructions stored in the storage 902, to implement the data transmission method provided in the foregoing embodiments of this application.

An embodiment of this application further provides a computer storage medium. The computer storage medium stores computer instructions. When the computer instructions are run on a computer, the computer is enabled to perform the foregoing related method steps to implement the method performed by the computing device 10 in the foregoing embodiments, implement the method performed by the BMC in the computing device 10 in the foregoing embodiments, or implement the method performed by the component in the computing device 10 in the foregoing embodiments. For details, refer to the descriptions of the steps in FIG. 2, FIG. 3, FIG. 4, or FIG. 6. Details are not described herein again.

An embodiment of this application further provides a computer program product. When the computer program product runs on a computer, the computer is enabled to perform the foregoing related steps to implement the method performed by the computing device 10 in the foregoing embodiments, implement the method performed by the BMC in the computing device 10 in the foregoing embodiments, or implement the method performed by the component in the computing device 10 in the foregoing embodiments. For details, refer to the descriptions of the steps in FIG. 2, FIG. 3, FIG. 4, or FIG. 6. Details are not described herein again.

In addition, an embodiment of this application further provides an apparatus. The apparatus may be a chip, a component, or a module. The apparatus may include a processor and a power supplying circuit that are connected. The power supplying circuit is configured to provide electric energy for running of the processor. When the apparatus runs, the processor may execute computer-executable instructions, so that the chip performs the method performed by the computing device 10 in the foregoing method embodiments, implements the method performed by the BMC in the computing device 10 in the foregoing embodiments, or implements the method performed by the component in the computing device 10 in the foregoing embodiments. For details, refer to the descriptions of the steps in FIG. 2, FIG. 3, FIG. 4, or FIG. 6. Details are not described herein again.

The computer storage medium, the computer program product, or the chip provided in embodiments of this application are all configured to perform the method performed by the computing device 10 provided above. For beneficial effects that can be achieved by the computer storage medium, the computer program product, or the chip, refer to the beneficial effects in the corresponding method provided above. Details are not described herein again.

Optionally, the computer-executable instructions in this embodiment of this application may also be referred to as application program code. This is not limited in this embodiment of this application.

All or some of the foregoing embodiments may be implemented by using software, hardware, firmware, or any combination thereof. When the software is used for implementing embodiments, all or some of embodiments may be implemented in a form of the computer program product. The computer program product includes one or more computer instructions. When the computer program instructions are loaded and executed on the computer, the procedure or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, an SSD), or the like.

The various illustrative logical units and circuits described in embodiments of this application may implement or operate the described functions by using a general-purpose processor, a digital signal processor, an ASIC, an FPGA or another programmable logical apparatus, a discrete gate or transistor logic, a discrete hardware component, or a design of any combination thereof. The general-purpose processor may be a microprocessor. Optionally, the general-purpose processor may also be a processor, controller, microcontroller, or state machine. The processor may also be implemented by a combination of computing apparatuses, such as a digital signal processor and a microprocessor, a plurality of microprocessors, one or more microprocessors with a digital signal processor core, or any other similar configuration.

Steps of the methods or algorithms described in embodiments of this application may be directly embedded into hardware, a software unit executed by a processor, or a combination thereof. The software unit may be stored in a RAM, a flash memory, a ROM, an EPROM, an EEPROM, a register, a hard disk, a removable magnetic disk, a CD-ROM, or a storage medium of any other form in the art. For example, the storage medium may connect to a processor so that the processor may read information from the storage medium and write information to the storage medium. Alternatively, the storage medium may be integrated into a processor. The processor and the storage medium may be disposed in the ASIC.

These computer program instructions may also be loaded onto a computer or another programmable data processing device, so that a series of operations and steps are performed on the computer or the other programmable device, thereby generating computer-implemented processing. Therefore, the instructions executed on the computer or the other programmable device provide steps for implementing a specific function in one or more processes in the flowcharts and/or in one or more blocks in the block diagrams.

Although this application is described with reference to specific features and embodiments thereof, it is clear that various modifications and combinations may be made to this application without departing from the spirit and the scope of this application. Correspondingly, the specification and accompanying drawings are only example description of this application defined by the appended claims, and are considered as any of or all modifications, variations, combinations, or equivalents that cover the scope of this application. A person skilled in the art can make various modifications and variations to this application without departing from the scope of this application. In this way, this application is intended to cover these modifications and variations of this application provided that these modifications and variations fall within the scope of the claims of this application and equivalent technologies thereof.

The invention claimed is:

1. A component authentication method comprising:

generating, by a baseboard management controller (BMC) of a computer, a first random number;

sending, by the BMC to a component of the computer after the computer is powered on, a first authentication request for initiating an access authentication on the component, wherein the first authentication request comprises the first random number;

signing, by the BMC using a first private key of the component, the first random number to obtain signature data;

sending, by the component to the BMC, a first access request comprising a first access authentication certificate of the component and the signature data;

sending, by the BMC to the component and in response to the first access request, a first access response for triggering the component to be booted when verification on the first access authentication certificate based on the signature data is succeeded; and rejecting, by the BMC and in response to the first access request, access to the component when verification on the first access authentication certificate is failed.

2. The component authentication method of claim 1, wherein before sending the first access request, the method further comprises:

sending, by the BMC to a management system of the computer, a second access request and a second access authentication certificate of the BMC; and sending, by the management system to the BMC, a second access response for triggering the BMC to perform access authentication on the component when verification on the second access authentication certificate succeeds.

3. The component authentication method of claim 1, wherein rejecting access to the component comprises alarming, by the BMC, the component.

4. The component authentication method of claim 1, wherein the component comprises a computing system, a storage system, an input/output (I/O) system, an acceleration system, and a memory expansion system.

5. The component authentication method of claim 4, wherein after sending the first access response, the method further comprises:

loading and running, by the component, a basic input/output system (BIOS) file when the component is the computing system; and loading and running, by the component, a firmware file when the component is one of the storage system, the I/O system, the acceleration system, or the memory expansion system.

6. The component authentication method of claim 1, wherein after sending the first access request, the component authentication method further comprises:

decrypting, by the BMC using a first public key of a certification authority (CA) and based on the first access request, the first access authentication certificate to obtain a second public key of the component;

decrypting, by the BMC based on the first access request and using the second public key, the signature data to obtain a second random number;

determining that verification on the first access authentication certificate succeeds when the second random number is consistent with the first random number; and determining that verification on the first access authentication certificate fails when the second random number is inconsistent with the first random number.

7. The component authentication method of claim 6, wherein the first access authentication certificate is preset in the component, wherein the component authentication method further comprises signing, by the BMC using a second private key of the CA, information about the component to obtain the first access authentication certificate, wherein the information comprises the second public key and a component identifier of the component, and wherein the first public key is preset in the BMC.

8. The component authentication method of claim 7, wherein the second public key, the first private key, and the component identifier are preset in the component, and wherein the component authentication method further comprises:

obtaining, by the component from the CA, the component identifier; and deriving, from the component identifier, the second public key and the first private key.

9. A component authentication method implemented by a baseboard management controller (BMC) in a computer, wherein the component authentication method comprises:

generating a first random number;

sending, to a component in the computer after the computer is powered on, a first authentication request for initiating an access authentication on the component, wherein the first authentication request comprises the first random number;

signing, using a first private key of the component, the first random number to obtain signature data;

receiving, from the component and in response to the first authentication request, a first access request comprising a first access authentication certificate of the component and the signature data;

sending, to the component, a first access response for triggering the component to be booted when verification on the first access authentication certificate based on the signature data is succeeded; and rejecting access to the component when verification on the first access authentication certificate is failed.

10. The component authentication method of claim 9, wherein before sending the first access request, the component authentication method further comprises:

sending, to a management system of the computer, a second access request and a second access authentication certificate of the BMC; and receiving, from the management system after verification on the second access authentication certificate is succeeded, a second access response for triggering the BMC to perform access authentication on the component.

11. The component authentication method of claim 9, wherein rejecting the access to the component comprises forbidding the component to be booted.

12. The component authentication method of claim 9, wherein after receiving the first access request, the component authentication method further comprises:

decrypting, using a first public key of a certification authority (CA) and based on the first access request, the first access authentication certificate to obtain a second public key of the component;

decrypting, based on the first access request and using the second public key, the signature data to obtain a second random number;

determining that verification on the first access authentication certificate succeeds when the second random number is consistent with the first random number; and determining that verification on the first access authentication certificate fails when the second random number is inconsistent with the first random number.

13. The component authentication method of claim 12, wherein the first access authentication certificate is preset in the component, wherein the component authentication method further comprises signing, using a second private key of the CA, information about the component to obtain the first access authentication certificate wherein the information comprises the second public key and a component identifier of the component, and wherein the first public key is preset in the BMC.

14. A component authentication method implemented by a component in a computer, wherein the component authentication method comprises:

receiving, from a baseboard management controller (BMC) in the computer after the computer is powered on, a first authentication request for initiating an access authentication on the component, wherein the first authentication request comprises a first random number;

sending, to the BMC, a first access request comprising a first access authentication certificate of the component based on the first authentication request and further comprising signature data based on the first random number;

receiving, from the BMC when verification on the first access authentication certificate based on the signature data is succeeded, a first access response for triggering the component to be booted; and receiving, from the BMC when verification on the first access authentication certificate is failed, a rejection.

15. The component authentication method of claim 14, wherein the first access authentication certificate is preset in the component, wherein the first access authentication certificate is based on information about the component and a first private key of a certification authority (CA), and wherein the information about the component comprises a public key of the component and a component identifier of the component.

16. The component authentication method of claim 15, wherein the public key, a second private key of the component, and the component identifier are preset in the component, and wherein the component authentication method further comprises:

obtaining, from the CA, the component identifier; and deriving, from the component identifier, the public key and the second private key.

17. The component authentication method of claim 14, wherein the component comprises a computing system, a storage system, an input/output (I/O) system, an acceleration system, and a memory expansion system.

18. An electronic apparatus comprising:

a baseboard management controller (BMC) configured to:

generate a first random number; and send, after the electronic apparatus is powered on, a first authentication request, wherein the first authentication request comprises the first random number;

an electronic configured to send, to the BMC, a first access request comprising a first access authentication certificate of a component based on the first authentication request and further comprising signature data, and wherein the BMC is further configured to:

sign, using a first private key of the component, the first random number to obtain the signature data;

send, to the component when verification on the first access authentication certificate based on the signature data is succeeded, a first access response for triggering the component to be booted; and reject access to the component when verification on the first access authentication certificate is failed.

19. The electronic apparatus of claim 18, further comprising a management system coupled to the BMC, wherein before sending the first access request, the BMC is further configured to send, a second access request and a second access authentication certificate of the BMC to the management system, and wherein the management system is configured to send, to the BMC after verification on the second access authentication certificate is succeeded, a second access response for triggering the BMC to perform access authentication on the component.

20. The electronic apparatus of claim 18, wherein the BMC is further configured to power off the component.

* * * * *